Dec. 12, 1967     F. BAGANOFF     3,358,231

ANALOGUE SIGNAL CORRELATOR

Filed Sept. 19, 1963     3 Sheets-Sheet 1

INVENTOR.
FREDERICK BAGANOFF
BY
Gravely, Lieder & Woodruff
ATTORNEYS

INVENTOR.
FREDERICK BAGANOFF

Dec. 12, 1967 F. BAGANOFF 3,358,231
ANALOGUE SIGNAL CORRELATOR
Filed Sept. 19, 1963 3 Sheets-Sheet 3

INVENTOR.
FREDERICK BAGANOFF
BY
Gravely, Lieder & Woodruff
ATTORNEYS

3,358,231
ANALOGUE SIGNAL CORRELATOR
Frederick Baganoff, St. Ann, Mo., assignor to McDonnell Aircraft Corporation, St. Louis, Mo., a corporation of Maryland
Filed Sept. 19, 1963, Ser. No. 310,102
4 Claims. (Cl. 324—83)

This disclosure is addressed to methods of and apparatus for analyzing dynamic signals by determining the degree of correlation between two signals, which may differ in such particulars as amplitude, phase displacement, wave shape and frequency.

There are many occasions when it is desirable to ascertain the relationship that one signal (or dynamic quantity) may bear to another. With essentially D.C. signals, where one is concerned only with amplitude relations that change slowly, the changes are perceptible to the observer and there is no great problem in making a comparison. When the amplitude relations change rapidly, as with periodic signals, or signals composed of many frequencies, it becomes much more difficult to arrive at meaningful expression of signal relationships, especially if there are differences in phase, wave shape or frequencies. Although it is not difficult to determine the instantaneous amplitude relations between periodic signals, the services of a mathematician or digital computer may be required in converting the rapidly changing instantaneous amplitude relations to useful information.

Briefly, the technique employed herein is that of deriving from the two input signals a pair of intermediate periodic signals, one of which is a measure of the instantaneous differences between the inputs and the other of which is a measure of the instantaneous sum of the inputs—i.e., one input is shifted 180° in deriving the second intermediate signal. For example, the input signals might be connected in series opposition to derive one intermediate signal and in complimentary or additive relationship to arrive at the other intermediate signal. The two intermediate dynamic signals are then separately converted, as by thermojunctions, to a pair of intermediate D.C. signals reflecting the above instantaneous amplitude relations, the D.C. signals being M.S. (means square) values. The intermediate D.C. signals are then connected in series opposition to arrive at a D.C. output signal reflecting the difference in the intermediate D.C. signals. The above description may be expressed by the left hand side of the mathematical expression:

thermojunction output $= K[\overline{(i_1-i_2)^2} - \overline{(i_1+i_2)^2}] = 4K\overline{i_1 i_2}$ where the parentheses contain the intermediate quantities and the bar over the quantities signifies the average or D.C. value. The right hand expression is the integral of a product which is the cross correlation by definition.

The significance of this approach may be better appreciated by considering such a system employed as a phase meter, in which case the peak or R.M.S. value of each periodic input signal is held to the same predetermined value. When the two input signals are in phase (0° phase displacement), one of the intermediate A.C. signals (and its derived D.C. signal) is at a maximum value and the other intermediate signal is zero. As the phase displacement between the inputs changes from 0°, one of the intermediate D.C. signals increases from zero and there is a corresponding reduction in the output signal. At a 90° phase displacement of the inputs, the two intermediate D.C. signals are equal, hence the D.C. output signal is zero. If the phase displacement is more than 90° the D.C. output signal becomes of a reversed polarity relative to a phase displacement less than 90°, the condition at 180° displacement being the opposite of that at 0°. Accordingly, the output signal can be connected to a D.C. meter with a centered neutral needle position and the dial calibrated in degrees to provide a direct reading of the phase displacement.

If the R.M.S. amplitudes of the input signals are permitted to vary with time, the D.C. output will reflect their R.M.S. amplitude relations as well as phase displacement. In such instance, the output meter might be calibrated from "+1" through "0" to "−1," the maximum reading corresponding to a predetermined expected peak condition from the input data. As such, the meter measures the "unnormalized or cross correlation function," which, in a most general sense, might express the vector dot product between a known wave form $e_1(t)$ and an unknown wave form $e_2(t)$. The output $E_0$ can be expressed $E_0 = E_1 E_2 \cos \theta$, where $E_1$ and $E_2$ are the R.M.S. or peak values of the periodic input signals and $\theta$ is their phase displacement. For complex signals composed of many frequencies, the expression becomes $$E_0 = \sum_{n=1}^{\infty} E_{1n} E_{2n} \cos \theta_n$$

where $n$ identifies the various frequencies.

In measuring phase displacement alone, it may be necessary to control the R.M.S. amplitudes of the two input signals with automatic gain or volume controls, the automatic gain controls being inactivated when determining the "cross correlation function." If both input signals $e_1(t)$ and $e_2(t)$ are modified in amplitude by an automatic gain control responsive to only one input signal $e_2(t)$, so that the output increases with an increase in input $e_1(t)$ and decreases with an increase in input $e_2(t)$, the output $E_0$ can be expressed $E_0 = E_1/E_2 \cos \theta$. The ratio $E_1/E_2$ is then the gain of the system under evaluation (where $E_1$ is output and $E_2$ is the input to system) while $\theta$ is the system's phase displacement. The output for this mode of operation is termed the "transfer function, $E_1/E_2 \cos \theta$." In conjunction with a tunable bandpass filter or a sweep sine wave generator, a plot of system gain as a function of frequency can be obtained.

While the above examples give some idea of the potential applications of the invention, there are many other uses. For example, such a device can be used as a tunable filter by applying a sine wave of selected tunable frequency to one input while the signal to be filtered is connected to the other input. Another application might be to indicate the onset of flutter or criticality of a system where the critical condition is reached when two types of vibration (bending and torsion) supplement one another to a predetermined degree and reach certain phase relationship. Other applications will lie in the medical measurement and servo control fields, or in correlation in space as well as in time of wave phenomenon. Accordingly, the term "correlation" is employed as generally descriptive of the methods and apparatus disclosed. The apparatus may be used as an indicator alone or as part of a more elaborate apparatus.

This disclosure recognizes that there are many situations where analogue techniques can be usefully employed in deriving such information as the phase displacement, amplitude, frequency or wave shape relationships that may exist between a pair of signals. The signals, of course, may originate in any way and may be responsive to any desired dynamic phenomena that one wishes to investigate. Among the objects and advantages of the methods and apparatus to be described might be mentioned simplicity of operation and calibration, low cost and small size of apparatus, reliability and accuracy, and a capacity to handle a wide variety of signal shapes and frequencies.

Further objects and attendant advantages of the invention will appear from the following description of preferred forms of the invention shown in the accompanying drawings, wherein.

Figure 1:
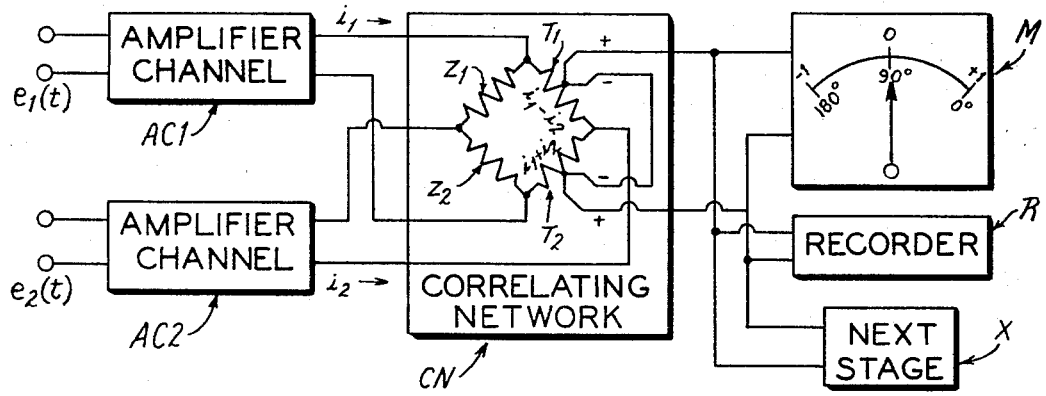
FIG. 1 is a block diagram illustrating certain principles of the correlator.

It will be understood the input to the correlator accepts two signals to be correlated. The signals may be obtained in any of a variety of well known ways, depending upon the use to which the correlator is put. One of the signals might be obtained from an oscillator and the other from a system under evaluation, or both inputs can be obtained from the system tested. There are a variety of known existing transducers for converting mechanical, thermal, and physiological phenomena to electrical signals, or the inputs might be obtained from signals previously recorded on tape. In FIG. 1 the input signals are designated $e_1(t)$ and $e_2(t)$ and are fed to separate amplifying channels AC1 and AC2 each of which may incorporate an adjustable gain for purposes of initial calibration and an automatic gain control for use in maintaining constant peak or R.M.S. amplitude values. The A.C. to D.C. conversion in the AGC feedback loop is actually an averaging circuit, but for any given signal input, the ratios between average R.M.S., and peak are known and this number can be applied to the calibration factor. Necessarily, there should be a minimum of distortion in the amplifiers.

The outputs $i_1$ and $i_2$ from the amplifiers are fed separately to a correlating network CN, where the signals are compared electrically and certain intermediate D.C. signals are derived. The circuit of FIG. 1 is of bridge like configuration with impedances $Z_1$ and $T_1$ connected in series across the output of AC2 and with impedances $Z_2$ and $T_2$ similarly connected in series across the output of AC2 and in parallel to $Z_1$ and $T_1$. The impedances $T_1$ and $T_2$ are in series connection across the output of AC1 as are impedances $Z_1$ and $Z_2$. It will be apparent that the output from the amplifier AC1 opposes that from AC2 at the impedance $T_1$ and supplements or complements that from AC2 at impedance $T_2$.

The devices $T_1$ and $T_2$ are adapted to convert the resultant A.C. signals $(i_1-i_2)$ and $(i_1+i_2)$ into D.C. or M.S. (means square) signals, which are fed in series opposition to output terminals. The conversion to M.S. signals may be conveniently accomplished using thermo-junctions, i.e. a resistive heater element with a thermocouple for producing a D.C. signal proportioned to the A.C. heating of the resistive element.

The output from the correlator may be connected to a meter M, a recorder R or the next stage X of a more elaborate electric system. The meter may be a D.C. meter with a centered null position for the needle, the dial being calibrated from "180" to "0" degrees to register phase displacement and from "$-1$" to "$+1$" to register the correlation function.

In the phase displacement mode of operation, the automatic gain controls are activated to hold the amplifier outputs $i_1$ and $i_2$ to constant R.M.S. values, and the variable gains are adjusted to produce a meter reading of "0°" when the two input signals are in phase. In such event, the intermediate A.C. signal across $T_1$ is zero ($i_1$ cancelling $i_2$ at all instants in time) and the intermediate A.C. signal across $T_2$ is the sum of $i_1$ and $i_2$ or twice $i_1$ or $i_2$, since their amplitudes are equal. $T_2$ generates its maximum D.C. signal which causes the meter needle to swing one way to the "0°" reading. If the phase displacement of $E_1$ and $E_2$ is "90°," the intermediate A.C. signals across $T_1$ and $T_2$ are equal and the derived intermediate D.C. signals are equal and opposite, hence the output is zero and the meter needle assumes the neutral center position, which indicates "90°." If the input signal displacement is "180°," the intermediate A.C. signal across $T_1$ is at its maximum value ($i_1-(-i_2)=i_1+i_2$), whereas the A.C. signal across $T_2$ is zero ($i_1+(-i_2)=0$).

The "correlation function" mode of operation is achieved by inactivating both automatic gain controls so that the output of the correlator will reflect cross power amplitude value as well as phase displacement. In this mode, the initial calibration or gain adjustments would be for maximum expected signals, which would produce readings of "$+1$" or "$-1$" depending upon phase. When the R.M.S. amplitude of one signal decreases, the change would be registered on the meter. For example, assuming the input phase displacement is "0°," equal maximum R.M.S. amplitudes of $E_1$ and $E_2$ would be registered as "0°" or "$+1$." If $E_2$ or $E_1$ dropped to zero, the meter would register "0." If $E_2$ or $E_1$ were reversed, the meter would register "$-1$."

The meter registers the degree of correlation, the output $E_0$ being expressed:

$$E_0 = E_1 E_2 \cos \theta$$

where $E_1$ and $E_2$ are R.M.S. values and $\theta$ is their phase displacement. In a general sense, this relationship expresses the vector dot product between a known wave form $e_1(t)$ and an unknown wave form $e_2(t)$. Such an application of the correlator would be useful in situations where amplitudes as well as phase relationship are significant, as in vibration tests or flutter onset indication.

Figure 2:
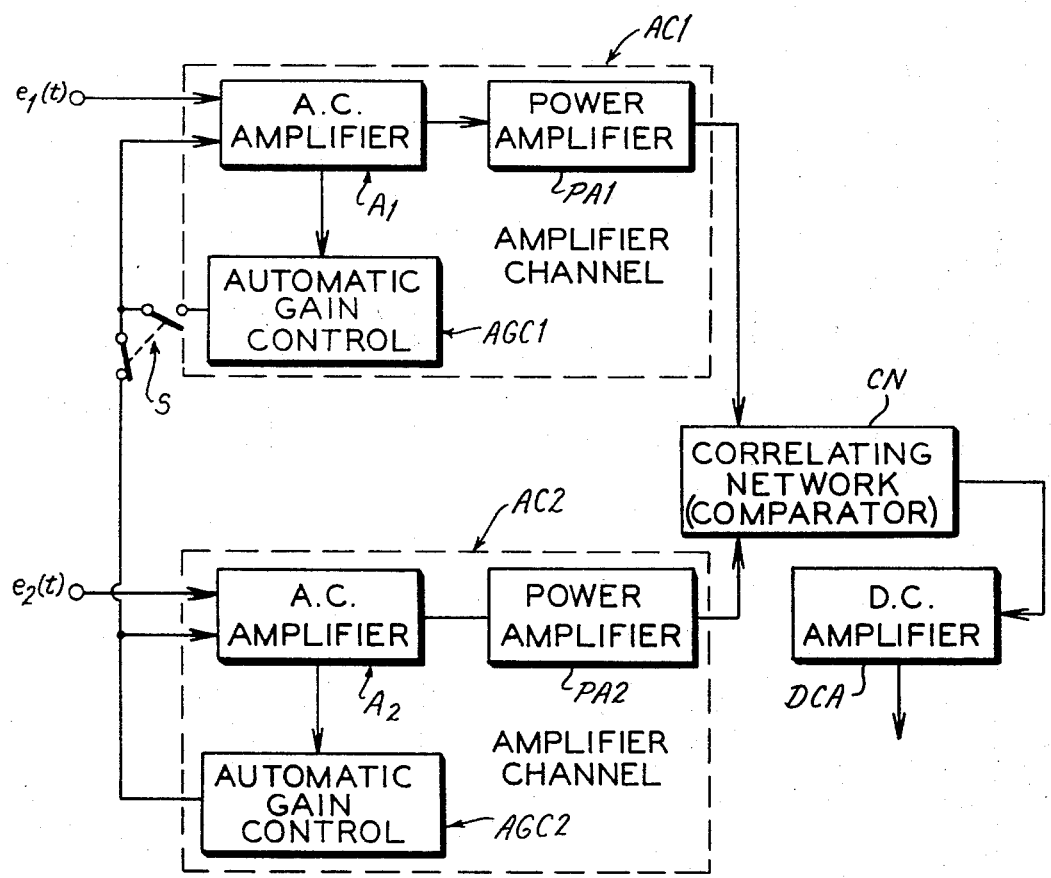
FIG. 2 is a more detailed block diagram similar to FIG. 1 but showing automatic gain controls to permit use of the correlator to determine amplitude ratios.

A third mode of operation is suggested in FIG. 2, where by setting a switch S the automatic gain control AGC1 for amplifier $A_1$ is inactivated and the automatic gain control AGC2 for the amplifier $A_2$ is connected to control both $A_1$ and $A_2$. The output $E_0$ of the comparator (correlating network) will then increase with an increase in input $E_1$ and will decrease with an increase in the input $E_2$, thus:

$$E_0 = \frac{E_1}{E_2} \cos \theta$$

The ratio $E_1/E_2$ is the gain of a system under test and $\theta$ is the system phase shift. These two quantities, which define the system "transfer function," can be obtained independently through the external use of a simple RC 90° phase shifting network, in which case the out of phase component is expressed thus:

$$E_{0(90°)} = \frac{E_1}{E_2} \sin \theta$$

These two quantities are commonly called the in-phase and out-of-phase cross powers. Simple trigonometric operations performed with an analogue computer will then separate these quantities.

The correlator in combination with a suitable time lag network will be able to produce auto and cross correlation data as a junction of the time lag.

It will further be apparent that the comparator may be used to compare an unknown wave shape against a known wave shape of the same frequency or to compare a signal of unknown frequency with a signal of adjustable known frequency obtained from an adjustable oscillator. When used as a phase meter, the comparator does not require adjustment to a particular frequency or wave shape, assuming identity of frequency and wave shape in the inputs. This represents a significant advantage over some existing devices.

Figure 3:
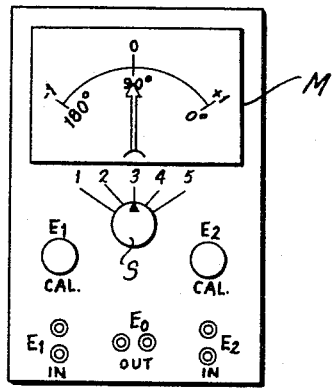
FIG. 3 is a diagram of the face of an instrument incorporating the correlator.

Referring now to FIG. 3, the face of an instrument is diagrammatically shown to have a meter M calibrated from "$-1$" to "$+1$" and from "180°" to "0°," with the center null position indicating "0" and "90°." The instrument also incorporates a five-position gang switch S, with the different settings providing for "1" calibration of one input $E_1$, "2" calibration of the other input $E_2$, "3" cross correlation reading, "4" phase angle reading, and "5" $E_1/E_2 \cos \theta$ reading. There are also adjusting knobs "CAL" for the gains in making the initial calibration, and terminals "IN" for the two inputs $E_1$ and $E_2$ and "OUT" for the output $E_0$, in case the X correlator is to be connected to other apparatus.

Figure 4:
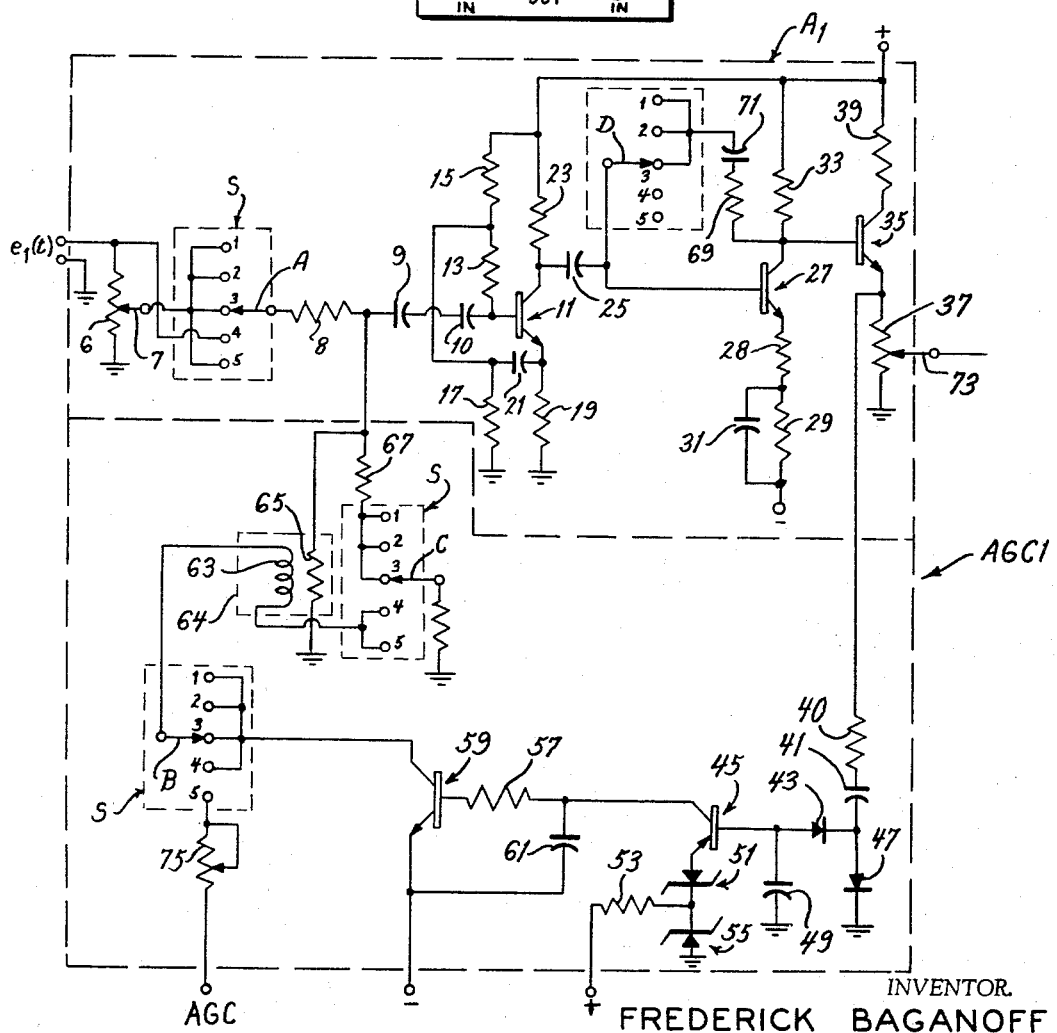
FIG. 4 is a detailed circuit diagram of an automatic gain control, such as might be used with the correlator.

Referring now to FIG. 4, there is shown an automatic gain control circuit. There would be such an AGC circuit for each input although only one is shown. The input $E_1(t)$ or $E_1$ is connected across a potentiometer 6, whose adjusting arm 7 is connected to the fixed contacts 1, 2, 3 and 5 of the first deck A of the five-position gang switch S. The input $E_1$ is connected directly to the fixed contact 4 of the switch S. The five fixed contacts correspond to the five positions mentioned above (FIG. 3) in the order given, and this situation will hold in relation to the other decks or sets of fixed contacts of the switch, to be described.

The movable contact A for the A deck is connected through a resistor 8, and series coupling capacitors 9 and 10 to the base of a transistor 11, the base also being connected through series resistors 13 and 15 to the positive terminal of a D.C. power supply. The power supply may be of conventional design, hence is not shown. The point between resistors 13 and 15 is grounded through resistor 17, and the emitter of transistor 11 is grounded through a resistor 19. A capacitor 21 connects the emitter of 11 to the point between resistors 13 and 15. The collector of the transistor 11 is connected to the positive power terminal through a resistor 23. It will be understood that the various resistors and capacitors associated with the transistors are selected to provide the proper biasing voltages for the particular characteristics of the transistor and to provide A.C. signal paths, this being a matter of conventional design. Indeed, the circuit, apart from the bridge and the AGC circuitry applications to be described and general arrangement of circuit sections is not deemed part of the invention, and is disclosed primarily for the purpose of giving one example of an operative system.

Continuing with the circuit of FIG. 4, a connection is made through a capacitor 25 from the collector of transistor 11 to the base of a second transistor 27, whose emitter is grounded through resistors 28 and 29 and bypass capacitor 31, and whose collector is connected to the positive power supply terminal through resistor 33. The collector of transistor 27 is then connected to the base of a third transistor 35, whose emitter is grounded through potentiometer 37 and whose collector is connected through a resistor 39 to the aforesaid positive supply terminal. The potentiometer 37 controls gain and is operated by the calibration knob "CAL" on the face of the instrument.

The three stages of the above circuit provide for proper matching of input and output impedances and for a variable gain action, dependent upon a feedback from the emitter of transistor 35 to the input of the first stage. This stage has sufficient AGC action to provide full heat to the thermojunction with signal inputs varying from 0.1 VP–P to 4.0 VP–P. Starting at the emitter of 35 the feedback circuit includes a resistor 40, a coupling capacitor 41, diode 43 and transistor 45. Diodes 43 and 47 and capacitor 49 form an A.C. to D.C. converter circuit for measuring the R.M.S. value of the input signal. Transistors 45 and 59 form a two stage D.C. amplifier for driving element 63. Zener diodes 51 and 55 are used for proper biasing of transistor 45. The feedback circuit continues from the collector of transistor 45 through a resistor 57 to the base of the second transistor 59, whose emitter is connected to the negative terminal of a suitable power source and through a capacitor 61 to the collector of transistor 45. The feedback circuit then continues from the collector of transistor 59 to the first four fixed contacts 1, 2, 3 and 4 of the B deck of the gang switch S. The movable contact B is connected through the input element 63 of a Raysistor 64 to the fixed contacts 4 and 5 of the C deck of the gang switch S, the movable contact C being grounded.

The Raysistor 64 is a device adapted to receive a D.C. or slowly fluctuating input signal and provide a variable resistance output (from element 65) responsive to the average amplitude of the input. For example, the input element might be a light and the output element 65 might be a light-sensitive impedance. Any similar device could be used although the disclosed system controls the gain over a rather wide range of input variations. The output element 65 is connected to the junction between the initial resistor 8 and capacitor 9, the arrangement being one to provide the AGC or automatic gain control action desired. The element 65 in effect, shunts the signal path; the resistance decreases when the input $E_1$ increases.

The C deck of the gang switch S has its fixed contacts 1, 2 and 3 connected through a resistor 67 to the aforesaid junction between 8 and 9, at the input to transistor 11, and this arrangement is one that produces the AGC action only in the "4" and "5" settings of the gang switch S (see FIG. 3). A D deck of the gang switch S is provided to connect a resistor 69 and capacitor 71 between the capacitor 25 and the collector of transistor 27 in the "1," "2," and "3" setting of the switch, this being desirable for compensation when the feedback is removed at the C deck.

Figure 5:
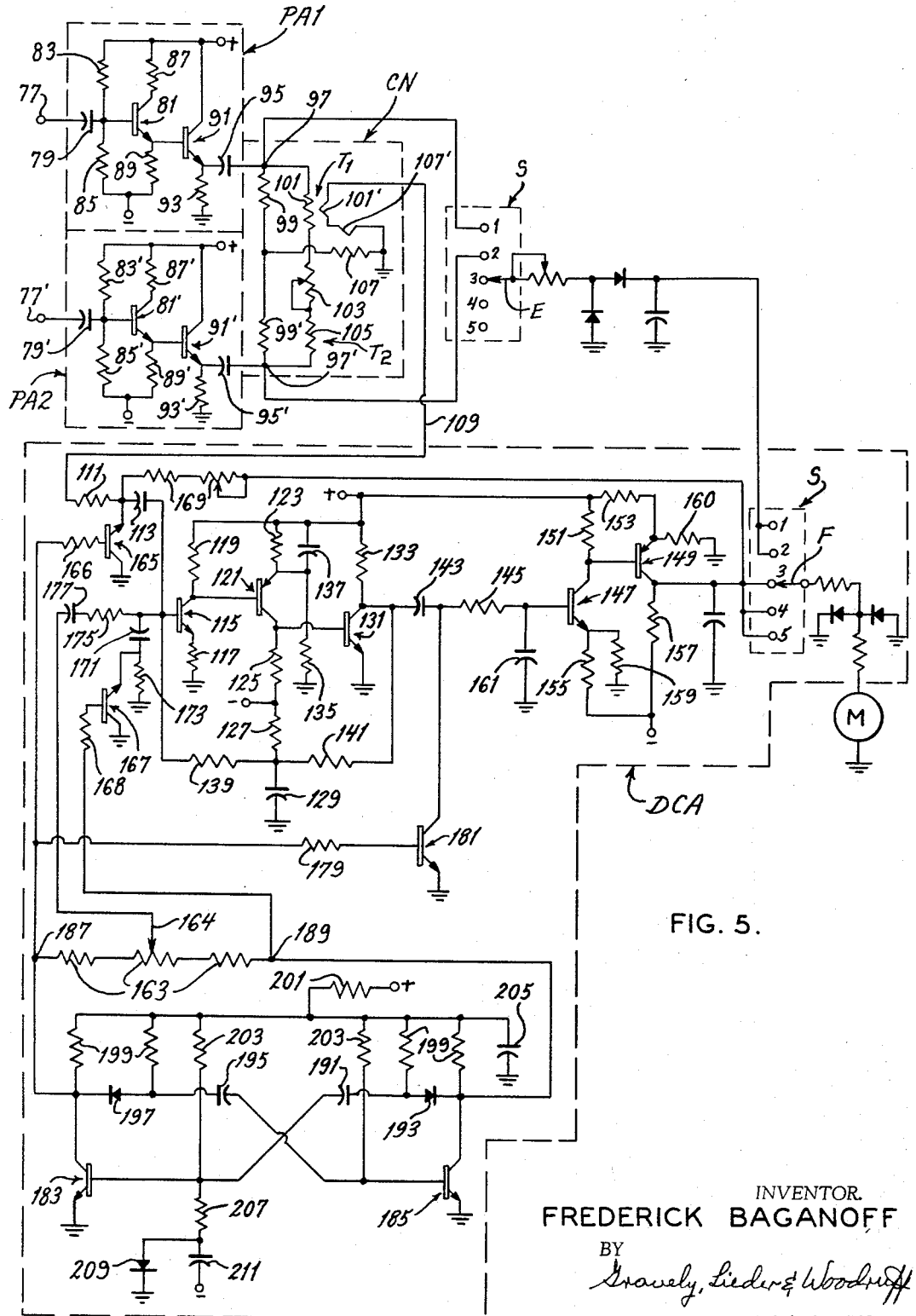
FIG. 5 is a detailed circuit diagram of other portions of the circuit for the correlator.

The output from the AGC circuit is taken from the gain varying potentiometer 37 by an adjustable contact 73 (right side of FIG. 4) and fed to the next stage of the system, which is shown in FIG. 5. It may be observed that the fixed contact 5 of the B deck for gang switch S is adapted for connection through an adjustable resistor 75 to the other AGC circuit (not shown) for the other input signal (i.e.—to the input element corresponding to Raysistor element 63 in the other AGC circuit), there being a separate similar AGC circuit for each input signal $E_1$ and $E_2$. This rearrangement of the AGC circuits at the "5" setting for switch S has been explained in connection with FIG. 2.

Referring to FIG. 5, the output from each AGC circuit is connected to the input 77 or 77' of an associated A.C. power amplifier PA1 or PA2, both amplifiers being shown in FIG. 5 within the broken line boxes as indicated. The two amplifiers are identical, hence only one is described. However, the elements in the second amplifier will have the same reference numerals with the "prime" sign added.

The input 77 is connected through a coupling capacitor 79 to the base of a first transistor 81, the base also being connected through resistors 83 and 85, respectively, to positive and negative terminals of a power supply. The collector of this transistor 81 is connected through a resistor 87 to the same positive supply terminal, and the emitter is connected through a resistor 89 to the negative terminal. The emitter is further connected to the base of a second transistor 91, whose collector is connected to the above positive supply terminal and whose emitter is connected to ground through a resistor 93. The output from the amplifier feeds through a coupling capacitor 95 to one input 97 of the bridge, correlating or comparing network CN, which forms an important part of this invention.

This comparing network is a bridged T designed to accept the outputs from the two single ended amplifiers without shorting out the legs of the circuit, the outputs being fed to opposite ends 97 and 97' of series connected resistors 99 and 99'. The input element 101 of one thermojunction $T_1$ (in series with an adjustable resistor 103 and fixed resistor 105) is connected across the amplifier outputs 97 and 97', so as to be responsive to the difference in instantaneous amplitudes of the signals. In other words, the input to the first thermojunction $T_1$ is maximum when the input signals are 180° out of phase. The impedances 99 and 99' are matched and the bridge is balanced by adjustment of 103 to the impedances of 101 and 107.

The input element 107' for the other thermojunction $T_2$ connects at the point between resistors 99 and 99' and with ground and operates inversely to that of the first thermojunction, its maximum input occurring when the phase displacement of the input singals is 0°.

It will be understood that each thermojunction has a resistive heater input element and a thermocouple output element producing a D.C. signal responsive to the m.s. value of the intermediate sum and difference signals. The respective output elements 101' and 107' are then connected in series opposition, so as to produce a net signal that reflects their difference, this net output signal being fed at 109 to the input of a chopper stabilizer D.C. amplifier DCA and thence to the meter M.

At this point, it may be noted that an E deck of the gang switch S has fixed contacts 1 and 2 connected, respectively, to the amplifier output terminals 97 and 97', the movable contact E being connected to fixed contacts 1 and 2 of an F deck of the switch S, whose movable contact F is connected to the meter M. (The meter may be a one volt D.C. meter.) The arrangement permits calibration of the instrument to the strength of the input signals $E_1$ and $E_2$ by setting the gang switch S to position "1" and "2" and adjusting the gains to produce the desired readings, generally "+1" or "−1." The input signals are now capable of producing full heat in the thermocouples and registering as +1 and −1 in the unnormalized correlation mode, if the phase is favorable.

The lead 109 is connected through a resistor 111 and coupling capacitor 113 to the base of a first transistor 115, whose emitter is grounded through a resistor 117 and whose collector is connected to the positive side of a power supply through a resistor 119. The collector of 115 is connected to the base of a second transistor 121, whose emitter is connected through a resistor 123 to the above positive side of the power source. The collector of 121 is connected through a resistor 125 to the negative terminal of a suitable power source, and through another resistor 127 and capacitor 129 to ground. The collector of 121 is then coupled directly to the base of a third transistor 131, whose emitter is grounded and whose collector is connected through resistor 133 to the positive terminal of the power supply. A resistor 135 and capacitor 137 are series connected between ground and the positive terminal of the power supply; a resistor 139 is connected between the base of transistor 115 and the point between resistor 127 and capacitor 129; and a resistor 141 connects the collector of transistor 131 to this point between 127 and 129.

The output from the collector 131 is fed through a coupling capacitor 143 and a resistor 145 to the base of a fourth transistor 147, and the collector of 147 drives the base of a fifth transistor 149, whose collector is connected to the fixed contacts 3, 4 and 5 of the F deck of the gang switch S. Biasing resistors 151 and 153 connect the collector and emitter of transistors 147 and 149, respectively, to the positive terminal of the power supply, whereas resistors 155 and 157 connect the emitter and collector, respectively, of 147 and 149 to the negative terminal. The emitters of 147 and 149 are also grounded through resistors 159 and 160 respectively, and the base of 147 is connected to ground through a capacitor 161. Zero adjustment of the D.C. amplifier is provided by a connection to a reference voltage source from a voltage divider 163, the sides of which are also connected to the respective bases of transistors 165 and 167 through resistors 166 and 168. The emitter of 165 is connected to the point between resistor 111 and coupling capacitor 113, and this point is further connected through resistors 169 to the collector of the last stage transistor 149. The emitter of 167 is connected through a coupling capacitor 171 to the base of transistor 115 and to ground through a resistor 173. The collectors of 165 and 167 are connected to ground. The adjusting arm 164 of the voltage divider 163 is connected through a resistor 175 and coupling capacitor 177 to the base of transistor 115. One side of the voltage divider is also connected through a resistor 179 to the base of a transistor 181, whose collector is connected to the point between capacitor 143 and resistor 145, the emitter of 181 being grounded. Other stabilization circuits could be used, however.

The above section following the comparing network CN is part of a D.C. amplifier for boosting the D.C. signal from the comparing network to a value sufficient to operate the meter. A flip-flop switching circuit is connected across the voltage divider 163 and thereby to the transistors 165 and 167, which function as switches.

The flip-flop circuit includes transistors 183 and 185, whose collectors are connected, respectively, to the opposite sides 187 and 189 of the voltage divider 163. The base of transistor 183 is connected through a capacitor 191 and diode 193 to the collector of 185, and the base of 185 is connected through a capacitor 195 and diode 197 to the collector of the transistor 183. Resistors 199 on opposite sides of the diodes 193 and 197 connect through a resistor 201 to the positive side of a power supply, and the base of each transistor 183 and 185 is connected through a resistor 203 and the resistor 201 to the positive terminal of the power supply. A capacitor 205 grounds the junction between resistor 201 and resistor 199 and 203. The emitter of each transistor 183 and 185 is connected direct to ground. The base of transistor 183 is connected to ground through a resistor 207 and thence through diode 209 and parallel connected capacitor 211.

It may be helpful to point out that the transistor 165 acts as a switch for periodically shorting out or chopping the input at 109 to the D.C. amplifier DCA, the transistor 165 being under control of the aforesaid flip-flop, or multivibrator circuit. Accordingly, the D.C. input at 109 is converted to A.C. and the first three transistor stages (115, 121 and 131) function as an A.C. amplifier for a chopped signal, this being desirable in order to avoid the instability inherent in straight D.C. amplification.

The connection formed by resistor 179 and transistor 181 functions as a decommutator to reconvert the chopped output from the third stage 131 back to a D.C. signal, and the transistor 167 and associated elements operates to counteract or correct for the leakage through the coupling capacitor 113. The last two transistor stages 147 and 149 function as a straight D.C. amplifier but with a feedback connection from the output of the final stage back through resistors 169 to the input of the first stage (capacitor 113). This feedback is provided to stabilize the D.C. amplifier against its tendency to drift. Gain of the D.C. amplification may be adjusted by adjustment of one of the resistors 169.

In operation, one input signal, say $e_1(t)$ or $E_1$ is connected into the instrument through the input terminals on the face, corresponding to the input terminal $E_1$ of FIG. 4 and ground. The gang switch is set to position "1" for calibration and the "CAL" knob or gain control potentiometer arm 73 for that input is adjusted to bring the meter indicator to "+1" or "−1." The above procedure is then repeated in calibrating for the other input signal $e_2(t)$ or $E_2$ with adjustment being made at its "CAL" knob or AGC circuit, and with the gang switch in the "2" position. The gang switch may then be set to position "3" to measure the cross correlation, or to position "4" to measure phase displacement, or to position "5" to measure $E_1/E_2 \cos \theta$. The above three settings, of course, produce different measures of the correlation between the two input signals, which may fluctuate over a period of time.

In the "1" and "2" settings, the AGC circuits are necessarily inactivated, as in the bridge, the signal going straight from the respective A.C. amplifier to the meter. The gain of the D.C. amplifier is initially adjusted at the resistors 169 to take up the loss of the bridge so that the same input signal, when passed to the bridge, will produce the same output signal at the meter, hence the D.C. amplifier is necessary to make up for the loss at the bridge.

When the instrument is adjusted to the "3" setting to measure cross correlation, the bridge is connected into the system, but the AGC circuits remain inactivated, so that the reading is influenced by the r.m.s. values as well as the phase displacements of the inputs. When the instrument is set at position "4" to measure phase angle or phase displacement, the AGC circuits are activated at gang switch decks B and C to hold the inputs to the bridge at constant r.m.s. values, so that the output to the meter is responsive to phase displacement alone. In the "5" setting, the gains of both AGC circuits is controlled by the feedback from only one AGC circuit to produce the action described previously in connection with FIG. 2.

It should be understood that the above is intended to be illustrative, rather than limiting and that the apparatus may be modified or utilized in ways other than those described. The possible applications, in particular, are many, but in many instances, require an understanding of mathematics which is beyond the scope of the disclosure. For example, two such correlators can be utilized with a 90° phase shift network to investigate second order dynamic systems.

What is claimed is:

1. Apparatus for correlating any two first and second dynamic electrical input quantities which may differ in amplitude, frequency, phase and wave shape, comprising first and second sources of input signals to be correlated, first amplifier means including associated automatic gain control means having an input connected to the first input signal source and output connection means, second amplifier means including associated automatic gain control means having an input connected to the second input signal source and output connection means, a bridge circuit including first and second input connection means connected respectively to the output connection means of said first and second amplifier means, said bridge circuit including impedance means connected between said first and second input connection means, means in said bridge circuit including said impedance means for combining the two input quantities to produce first and second bridge signals respectively representing functions of the sum and difference of the input quantities, temperature sensitive means responsive respectively to the first and second bridge signals, said temperature sensitive means producing D.C. signals respectively representing the mean square values of the corresponding bridge signals, output circuit means connected to said temperature sensitive means including means for combining the D.C. signals produced by said temperature sensitive means and meter means including means responsive to said combined D.C. signals for indicating the magnitude and phase relationships of the input quantities and means for selectively connecting said automatic gain control circuit associated with the first amplifier circuit to control the gain of both of said first and second amplifier circuits, and means responsive to the ratio of the magnitudes of the bridge signals when the first and second amplifier circuits are controlled by the said automatic gain control circuit of said first amplifier circuit to indicate data from which transfer function can be determined.

2. Apparatus for correlating two dynamic input signals which may have any frequencies, phases, magnitudes and wave shapes comprising an impedance bridge circuit having a bridge T configuration including connected impedances forming a head portion and other impedances connected to the head portion at an intermediate location to form a stem portion, first and second input means connected to opposite ends of the head portion in the T to receive respective ones of the dynamic input signals, the impedances of said bridge T circuit being connected to include means to combine the input signals additively to produce a first bridge signal component in one portion of the impedance network and other means for combining the input signals subtractively to produce a second bridge signal component in a second portion of the impedance network, first temperature sensitive means associated with the first portion of the impedance network for responding to the first bridge signal to produce a first D.C. signal representing the mean square value of said first bridge signal, said second temperature sensitive means associated with the second portion of the impedance network responding to the second bridge signal to produce a second D.C. signal representing the means square value of the second bridge signal, means including meter means connected in series circuit with said first and second temperature sensitive means, said meter means including means responsive to the combined first and second D.C. signals and other means for indicating from said responses the magnitude and phase relationships of the dynamic input signals, the head portion of the bridge T includes a pair of matched impedances connected together and to one end of the stem portion, and third impedance means connected between the opposite ends of the head portion, said first temperature sensitive means being associated with said third impedances to respond to a total current flow between the ends of the head portion, and the second temperature sensitive means being associated with the impedance means forming the stem portion of the bridge to respond to the current flow therein.

3. Apparatus for correlating a pair of complex alternating current input signals from separate sources comprising a pair of amplifier circuits having inputs connected respectively to the separate input signal sources, each of said amplifier circuits having an output, a correlation circuit network including an impedance bridge circuit having first and second pairs of input connections, said bridge circuit including means for combining the input signals additively to produce a first bridge signal in one portion of the bridge circuit representing said additive combination, and other means in said bridge for combining the input signals subtractively to produce a second bridge signal in another portion of the bridge representing said subtractive combination, temperature sensitive means including a first thermojunction coupled to the bridge circuit adjacent said one portion thereof to produce a first D.C. signal which is a function of the additive relationship of the input signals, a second thermojunction coupled to the bridge circuit adjacent to said other bridge portion to produce a second D.C. signal which is a function of the subtractive relationship of the input signals, the said first and second D.C. signals corresponding respectively to the mean square values of the corresponding bridge signals, means for combining the D.C. signals produced by said first and second temperature sensitive elements to produce an output signal representing the combination thereof, circuit control means making the output signal selectively dependent on the phase relationship of the input signals, said last named means including automatic gain control means responsive to the amplitude of the signal applied to the input of one of the amplifier circuits, and means selectively connecting said automatic gain control means to each amplifier circuit of said pair of amplifier circuits to simultaneously vary the gain of said amplifier circuits in inverse relation to the amplitude of said one amplifier input signal.

4. A signal correlation circuit network for comparing and analyzing two alternating current input signals comprising first and second input signal sources, first and second amplifier circuits having inputs connected respectively to the input signal sources, first and second automatic gain control circuits associated respectively with said first and second amplifier circuits for controlling the gain characteristics of said amplifier circuits, switch means having a first operating position connecting said automatic gain control circuits to control the associated amplifier circuits, said switch means having an alternate operating position disconnecting one of said automatic gain control circuits from its associated amplifier circuit and connecting the other automatic gain control circuit to control said first and said second amplifier circuits, a bridge circuit having first input connections connected to the output of the first amplifier circuit, second input connections connected to the ouput of said second amplifier circuit, said bridge circuit including an impedance network connected to produce a first bridge signal component representing a function of the sum of the outputs of the amplifier circuits and a second bridge signal component representing a function of the difference between the amplifier outputs, means including temperature sensitive means responsive respectively to said first and second bridge signal components for producing D.C. signals corresponding respectively to the mean square values thereof, means for combining said D.C. sum and difference signals to produce a signal output representing the cross correlation characteristics of the alternating current inputs, and meter means connected to respond to said combined D.C. sum and difference signals, said meter means including means for indicating phase and magnitude characteristics of the input signals.

References Cited

UNITED STATES PATENTS

| | | |
|---|---|---|
| 2,169,116 | 8/1939 | Thompson. |
| 2,405,073 | 7/1946 | Troell _____ 324—87 |
| 2,512,927 | 6/1950 | Freas _____ 324—87 XR |
| 2,861,177 | 11/1958 | Dishal et al. _____ 324—57 XR |
| 2,911,593 | 11/1959 | Cauchois et al. ____ 324—83 XR |
| 2,962,658 | 11/1960 | Trexler _____ 324—87 XR |
| 3,052,846 | 9/1962 | Hill _____ 321—1.5 XR |
| 3,122,654 | 2/1964 | Roalef _____ 328—208 XR |
| 3,210,663 | 10/1965 | Moseley et al. ____ 324—106 XR |

OTHER REFERENCES

Radio Engineers' Handbook, F. E. Terman, McGraw-Hill Book Co., New York (1943), page 918 (copy available in 324).

RUDOLPH V. ROLINEC, *Primary Examiner.*

FREDERICK M. STRADER, WALTER L. CARSON,
*Examiners.*

P. F. WILLE, *Assistant Examiner.*